United States Patent Office 3,219,720
Patented Nov. 23, 1965

3,219,720
PROCESS FOR THE PREPARATION OF DURENE
Hans Binder, Frankfurt am Main, and Jozef Sulo, Bochum, Germany, assignors to Rutgerswerke-Aktiengesellschaft, Frankfurt am Main, Germany
No Drawing. Filed Feb. 25, 1963, Ser. No. 260,891
Claims priority, application Germany, Feb. 27, 1962, R 32,181
3 Claims. (Cl. 260—668)

It has been known from the art that durene can be obtained by isomerization of polyalkylbenzenes which are commercially of inferior importance.

Isomerization of polyalkylbenzenes has been hitherto carried out mainly in the presence of the catalysts HF, $BF_3$ and their combinations (see, for example, U.S. Patent No. 2,784,242). These polyalkylbenzene mixtures contain mainly polymethylbenzenes, isodurene being present in an amount over 60%, while the rest consists of tri- and pentamethylbenzenes. In minor amounts related aromatic fractions contain also polyethyl- and polyisopropyl-benzenes.

It has now been found that durene can be obtained from polyalkylbenzene mixtures by isomerization in the presence of $AlCl_3$ as catalyst. The essential advantages of this process consist in that durene can be recovered in very simple manner and in the presence of a considerably smaller amount of catalyst in comparison with the known processes.

Isomerization of polyalkylbenzenes with anhydrous $AlCl_3$ according to the present invention is carried out in the temperature range of 40 to 110° C. under normal atmospheric pressure in the presence of 0.5 to 5 mol percent of $AlCl_3$.

Polyalkylbenzene fractions which are suitable for the present process are obtained in considerable amounts in the reformation of mineral oil fractions, in the distillation of mineral oil and/or of coal tar. They should be freed in a manner known by itself from durene and will have then a boiling range of 187–205° C. and contain—at a content of aromatic compounds of 90%—at least 40% polyalkylbenzenes.

After termination of the isomerization, the reaction mixture is treated with an equal amount or a moderate excess of water in order to remove the $AlCl_3$ from the mixture. Thereby an oil layer is formed and the durene is recovered from this oil layer in conventional manner by freezing out.

Example 1

In a three-necked flask which is provided with a stirrer, a thermometer and a reflux cooler, to 100 parts of a fraction which contains aromatic compounds, has a boiling range of 188-198° C., and from which durene present in it has been previously removed by repeated cooling out and filtering at —20° C., 1 part of anhydrous $AlCl_3$ is added. The mixture is heated to 50° C. under constant stirring and kept at this temperature for one hour. The reaction product is mixed with excess water, the hydrocarbon mixture is separated, washed several times with water, neutralized with NaOH and from the oily layer the durene is recovered by cooling to about —20° C. in a manner known by itself. 20 parts of durene are thus obtained with a degree of purity of 78%. By recrystallization from pure ethyl alcohol 14 g. of durene having a melting point of 79° C. and a boiling point of 194° C. are obtained.

Example 2

In the apparatus described in the above Example 1, to 100 parts of a fraction containing aromatic compounds (boiling range 187-200° C., containing 95% of aromatic compounds, the durene being removed by repeated cooling out and filtering at —20° C. from said fraction) 1 part of anhydrous $AlCl_3$ is added. The mixture is heated to 100° C. and kept at this temperature under continuous stirring for one hour. The reaction mixture is treated with cold water and the oil layer formed thereby removed. By thorough cooling and filtering 17.15 parts of durene of 80% are obtained.

Example 3

In the apparatus described in the above Example 1, to 100 parts of a fraction containing aromatic compounds (boiling range 180–200° C., containing 98% of aromatic compounds, the durene being removed from said fraction in conventional manner previously) 3 parts of anhydrous $AlCl_3$ are added. The mixture is heated to 50° C. and kept for 3 hours under intensive stirring at this temperature. Subsequently, the reaction mixture is mixed with water, the oily layer thereby formed is removed, cooled to —20° C. and the durene crystallized out filtered at this temperature. This treatment is repeated until no more crystals are separated. 12.6 parts durene of 79% are thus obtained.

Example 4

In the apparatus described in the above Example 1, 100 parts of a polymethylbenzene-fraction, from which the durene was removed in conventional manner by freezing out and which has a boiling range between 185°– 195° C., are heated with 2 parts $AlCl_3$ to 80° C. and this temperature is maintained under intensive stirring for 1½ hours. Subsequently the reaction mixture is mixed with water and washed like in the preceding examples, the oily layer is separated and the crystallized durene is filtered off. This is repeated until no further separation of crystals occurs. 15 parts durene of 90% are thus obtained.

Example 5

In an apparatus of the type described in the above Example 1, 150 parts of a polymethylbenzene-fraction (boiling range 184–197° C.), which consists of 96% aromatics and from which durene was removed in conventional manner by freezing out, are mixed with 4 parts anhydrous $AlCl_3$, heated to 60° C. and kept at this temperature under intensive stirring for one hour. The reaction product is mixed with excess water, the hydrocarbon mixture is washed a few times with water, and neutralized with NaOH. From the oily layer thus obtained the durene is separated at —20° C. by cooling in conventional manner. 19 parts durene of a purity of 82% are thus recovered.

The parts and percent herein are by weight if not otherwise mentioned.

What is claimed is:

1. A process for obtaining durene by isomerization of polyalkylbenzenes, essentially consisting of heating polyalkylbenzene containing as the catalyst 0.5–5 mol percent of anhydrous $AlCl_3$, per mol of polyalkylbenzene, under ordinary atmospheric pressure, in the temperature range of 40–110° C., treating the resulting reaction product with water to form an oily layer, separating the oily product from water and separating the durene from the oily product by cooling the latter to a temperature of —20° C., and filtering it at said temperature.

2. A process for obtaining durene by isomerization of polyalkylbenzenes present in mineral oil fractions, mineral oil distillates and coal tar oils and distillates, comprising heating said polyalkylbenzenes, containing as the catalyst 0.5–5 mol percent anhydrous $AlCl_3$ per mol of polyalkylbenzene under ordinary atmospheric pressure in the presence of 0.5–5.0 mol percent of anhydrous $AlCl_3$ per mol of polyalkylbenzenes in the temperature range of 40–110° C., treating the resulting reaction product with water to form an oily layer, separating the oily layer from the water and separating the durene from the oily product by cooling the latter to −20° C. and filtering it at said temperature.

3. A process for obtaining durene by isomerization of polyalkylbenzenes present in mineral oil fractions, mineral oil distillates and coal tar oils and distillates, consisting essentially of heating said polyalkylbenzenes containing as the catayst 0.5–5 mol percent of anhydrous $AlCl_3$, under ordinary atmospheric pressure in the presence of 0.5–5 mol percent of anhydrous $AlCl_3$ per mol of polyalkylbenzenes in the temperature range of 40–110° C., mixing the resulting reaction product with water to form an oily layer and recovering durene from the oily layer.

References Cited by the Examiner
UNITED STATES PATENTS

| | | | |
|---|---|---|---|
| 2,404,591 | 7/1946 | Naragon | 260—668 |
| 2,874,200 | 2/1959 | Sanford | 260—668 |
| 3,031,513 | 4/1962 | Earbart et al. | 260—668 |

OTHER REFERENCES

Egloff et al.: Isomerization of Pure Hydrocarbons, Reinhold Publishing Corp., New York, 1942, pp. 154–156 relied upon.

Lacey et al.: "Friedel-Crafts Reactions," Industrial and Engineering Chemistry, vol. 46, No. 9, pages 1827–1829.

DELBERT E. GANTZ, *Primary Examiner.*

ALPHONSO D. SULLIVAN, *Examiner.*